United States Patent
Chiyo et al.

(10) Patent No.: US 10,272,789 B2
(45) Date of Patent: Apr. 30, 2019

(54) WIRELESS POWER SUPPLY SYSTEM AND WIRELESS POWER TRANSMISSION SYSTEM

(71) Applicant: TDK CORPORATION, Tokyo (JP)

(72) Inventors: Noritaka Chiyo, Tokyo (JP); Yasuhiro Terasaki, Tokyo (JP); Mitsunari Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 232 days.

(21) Appl. No.: 15/304,817

(22) PCT Filed: May 14, 2015

(86) PCT No.: PCT/JP2015/063917
§ 371 (c)(1),
(2) Date: Oct. 17, 2016

(87) PCT Pub. No.: WO2015/178284
PCT Pub. Date: Nov. 26, 2015

(65) Prior Publication Data
US 2017/0043668 A1    Feb. 16, 2017

(30) Foreign Application Priority Data
May 19, 2014 (JP) .................. 2014-103047

(51) Int. Cl.
*B61L 11/00* (2006.01)
*B60L 11/18* (2006.01)
(Continued)

(52) U.S. Cl.
CPC ............ *B60L 11/182* (2013.01); *B60L 5/005* (2013.01); *B60L 11/1824* (2013.01); *B60M 1/36* (2013.01);
(Continued)

(58) Field of Classification Search
CPC ...... B60L 9/00; B60L 9/02; B60L 9/16; B60L 11/00; B60L 11/02; B60L 11/08; B60L 11/18; B60L 11/182
See application file for complete search history.

(56) References Cited

U.S. PATENT DOCUMENTS

| | | | |
|---|---|---|---|
| 8,221,024 B2 * | 7/2012 | Jeter | ................. B60L 5/005 318/135 |
| 2010/0065352 A1 | 3/2010 | Ichikawa | |
| 2011/0148351 A1 | 6/2011 | Ichikawa | |

FOREIGN PATENT DOCUMENTS

| | | |
|---|---|---|
| JP | 2011-072188 A | 4/2011 |
| JP | 2011-167031 A | 8/2011 |

OTHER PUBLICATIONS

Jun. 9, 2015 International Search Report issued in International Patent Application No. PCT/JP2015/063917.
(Continued)

*Primary Examiner* — Robert J McCarry, Jr.
(74) *Attorney, Agent, or Firm* — Oliff PLC

(57) ABSTRACT

A wireless power supply system is a wireless power supply system provided with a travel lane for wirelessly transmitting power to a moving body and includes a power transmitting coil that is disposed such that the axial direction of the coil is substantially parallel to the width direction of the travel lane, and electromagnetic shielding walls that are disposed on the respective sides of the travel lane in the extension direction of the travel lane.

8 Claims, 2 Drawing Sheets

(51) Int. Cl.
    *H02J 50/10*    (2016.01)
    *H02J 7/02*     (2016.01)
    *H02J 50/12*    (2016.01)
    *H01F 27/36*    (2006.01)
    *H01F 38/14*    (2006.01)
    *B60L 5/00*     (2006.01)
    *B60M 1/36*     (2006.01)
    *B60M 7/00*     (2006.01)
    *H02J 50/70*    (2016.01)

(52) U.S. Cl.
    CPC ........... *B60M 7/003* (2013.01); *H01F 27/365* (2013.01); *H01F 27/367* (2013.01); *H01F 38/14* (2013.01); *H02J 7/022* (2013.01); *H02J 50/10* (2016.02); *H02J 50/12* (2016.02); *H02J 50/70* (2016.02); *B60L 2230/10* (2013.01); *Y02T 10/7005* (2013.01); *Y02T 10/7088* (2013.01); *Y02T 90/12* (2013.01); *Y02T 90/121* (2013.01); *Y02T 90/122* (2013.01); *Y02T 90/14* (2013.01)

(56) References Cited

OTHER PUBLICATIONS

Jun. 9, 2015 Written Opinion of the International Searching Authority issued in International Patent Application No. PCT/JP2015/063917.

\* cited by examiner

WIRELESS POWER SUPPLY SYSTEM AND WIRELESS POWER TRANSMISSION SYSTEM

TECHNICAL FIELD

The present invention relates to a wireless power supply system and a wireless power transmission system for wirelessly transmitting power to a moving body.

BACKGROUND ART

Recently, a wireless power transmission technique using an electromagnetic induction interaction between a primary (power transmitting) coil and a secondary (power receiving) coil that face each other to transmit power without a physical contact, such as a cable, has been drawing attention, and the extensive use thereof in a power supply apparatus for charging a secondary battery mounted on an electric vehicle (EV) or a hybrid electric vehicle (HEV) is anticipated.

Such a wireless power transmission technique enables power transmission without a physical contact, and therefore, is expected to be applied to an external power supply apparatus for a travelling electric vehicle or hybrid electric vehicle. For example, Patent Literature 1 discloses a technique for efficiently transmitting power to an on-vehicle power storage apparatus from a power supply apparatus external to the vehicle while the vehicle is traveling by using a plurality of secondary resonant coils provided to the moving body.

Meanwhile, in a case of applying the wireless power transmission technique to a charging apparatus in a power electronics apparatus, such as an electric vehicle, transmission of a large amount of power is required, and therefore, a large current needs to be supplied to a coil. Accordingly, the intensity of a leakage magnetic field formed in a location away from the coil is high, which might cause an electromagnetic disturbance that adversely affects nearby electronic devices and so on.

On the other hand, Patent Literature 2 proposes a non-contact power transmission apparatus including an electromagnetic shielding member that opens only in one direction so as to enable power transmission from a power transmitting resonator to a power receiving resonator, the power transmitting resonator being housed inside the electromagnetic shielding member.

CITATION LIST

Patent Literature

Patent Literature 1: Japanese Unexamined Patent Application Publication No. 2011-167031
Patent Literature 2: Japanese Unexamined Patent Application Publication No. 2011-072188

SUMMARY OF INVENTION

Technical Problem

By the way, in a case of performing wireless power transmission while an electric vehicle is travelling, the power transmission is performed in an environment in which the relative position relationship of the power receiving coil to the power transmitting coil changes in the travel direction. In such an environment, if the axial direction of each of the power transmitting and power receiving coils is in the up-down direction, the intensity and distribution of a leakage magnetic field formed in a location away from the coils significantly change depending on the relative position relationship of the power receiving coil to the power transmitting coil, as disclosed by Patent Literature 1.

Even if the technique disclosed by Patent Literature 2 is applied to the technique disclosed by Patent Literature 1, when the relative position relationship of the power receiving coil to the power transmitting coil changes, magnetic flux leakage easily occurs between the electromagnetic shielding member in which the power transmitting resonator is housed and an electromagnetic shielding member in which the power receiving resonator is housed, which might result in an unwanted leakage magnetic field formed nearby.

Accordingly, the present invention has been made in view of the above-described problem, and an object thereof is to provide a wireless power supply system and a wireless power transmission system with which a leakage magnetic field can be reduced effectively even if the relative position relationship of a moving body to a power transmitting coil changes.

Solution to Problem

A wireless power supply system according to the present invention is a wireless power supply system provided with a travel lane for wirelessly transmitting power to a moving body, the wireless power supply system including: a power transmitting coil that is disposed such that an axial direction of the power transmitting coil is substantially parallel to a width direction of the travel lane; and electromagnetic shielding walls that are disposed on respective sides of the travel lane in an extension direction of the travel lane.

According to the present invention, the power transmitting coil that is disposed such that the axial direction of the coil is substantially parallel to the width direction of the travel lane generates a magnetic field oriented substantially parallel to the surface of the travel lane and substantially orthogonal to the direction of travel of the moving body. That is, a direction in which magnetic flux leaks from the power transmitting coil is the direction that is substantially orthogonal to the direction of travel of the moving body. In this case, even if the relative position relationship of the moving body that moves on the travel lane to the power transmitting coil changes, the direction in which magnetic flux leaks from the power transmitting coil is always the direction substantially orthogonal to the direction of travel of the moving body. Further, in the present invention, the electromagnetic shielding walls are disposed in the extension direction of the travel lane, and therefore, the electromagnetic shielding walls are positioned in the direction in which magnetic flux leaks from the power transmitting coil. As a result, it is possible to reduce the leakage magnetic field effectively even if the relative position relationship of the moving body to the power transmitting coil changes.

Preferably, the electromagnetic shielding walls each include a magnetic wall and a conductive wall that is disposed on an external side of the magnetic wall. In this case, within magnetic flux generated by the power transmitting coil, magnetic flux that makes a large circuit extending to a location away from the power transmitting coil can easily form a magnetic path that passes through the magnetic walls, which have a low magnetoresistivity. Further, the conductive walls respectively disposed on the external sides of the magnetic walls suppress passing of magnetic flux from the magnetic walls to outside of the travel lane. As a result, magnetic flux that leaks outside the electromagnetic shielding walls is reduced, and the intensity of the leakage magnetic field represented by the magnetic flux density outside the electromagnetic shielding walls decreases. Accordingly, the leakage magnetic field can be reduced more effectively.

More preferably, the wireless power supply system further includes a magnetic coupling member that magnetically couples the magnetic walls disposed on the respective sides of the travel lane with each other. In this case, within magnetic flux generated by the power transmitting coil, magnetic flux that makes a large circuit extending to a location away from the power transmitting coil can easily form a magnetic path that passes through one of the magnetic walls, the magnetic coupling member, and the other magnetic wall. As a result, magnetic flux that leaks outside the electromagnetic shielding walls is further reduced, and the leakage magnetic field can be reduced more effectively. Note that "magnetically coupling" mentioned here means disposing the magnetic coupling member so that the magnetic resistance of a magnetic path that passes through the magnetic walls and the magnetic coupling member decreases.

More preferably, the wireless power supply system further includes a conductive sheet that is disposed between the power transmitting coil and the magnetic coupling member. In this case, the conductive sheet suppresses magnetic coupling between the power transmitting coil and the magnetic coupling member. Therefore, it is possible to prevent a decrease in power transmission efficiency caused by reduction of magnetic flux that is linked with a power receiving coil provided in the moving body.

A wireless power transmission system according to the present invention includes the above-described wireless power supply system and a moving body on which a power receiving coil is mounted. The electromagnetic shielding walls have a height that is higher than a height at which the power receiving coil is positioned. According to the present invention, it is possible to provide a wireless power transmission system with which a leakage magnetic field can be reduced effectively even if the relative position relationship of the moving body to the power transmitting coil changes. Further, in the wireless power transmission system according to the present invention, the height of the electromagnetic shielding walls is higher than the height at which the power receiving coil is positioned, and therefore, magnetic flux that leaks outside the electromagnetic shielding walls can be further reduced. As a result, it is possible to provide a wireless power transmission system with which the leakage magnetic field can be reduced with more certainty.

Advantageous Effects of Invention

As described above, according to the present invention, it is possible to provide a wireless power supply system and a wireless power transmission system with which a leakage magnetic field can be reduced effectively even if the relative position relationship of a moving body to a power transmitting coil changes.

DESCRIPTION OF EMBODIMENTS

Figure 1:
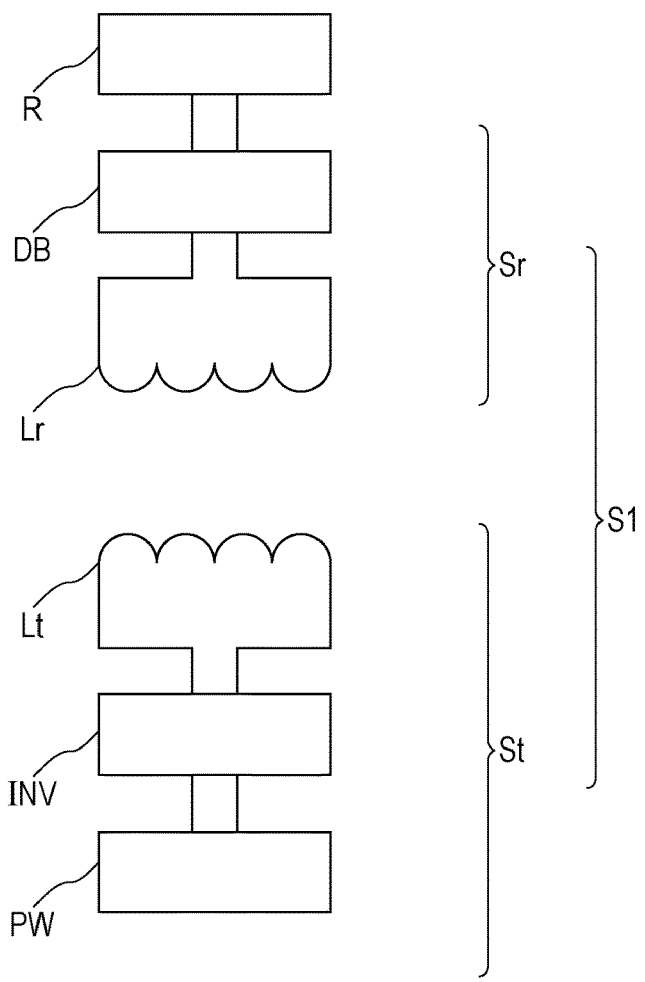
FIG. 1 is a schematic system configuration diagram illustrating an electrical configuration of a wireless power transmission system according to a preferred embodiment of the present invention and a load together with a load R.

A detailed description of a mode for implementing the present invention (embodiment) will be given with reference to the drawings. Note that, in the description, the same reference characters are used for the same elements or elements having the same functions, and a duplicated description is omitted.

Figure 2:
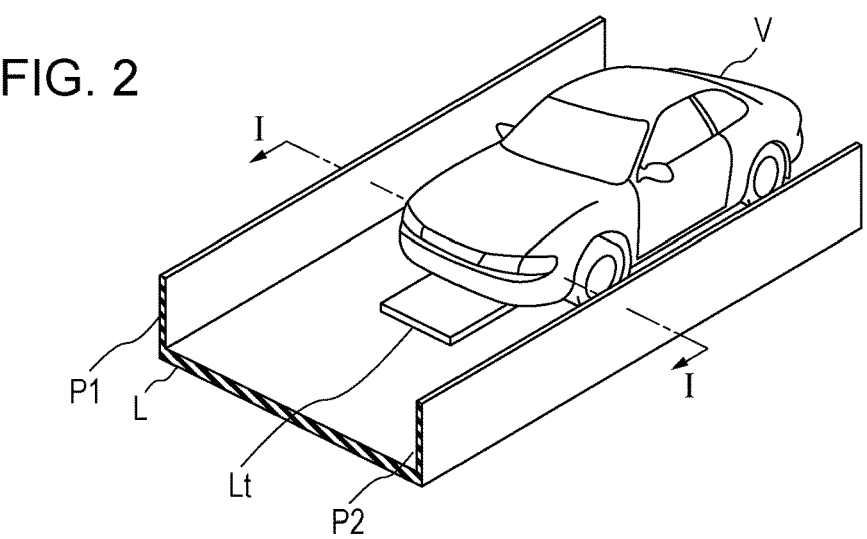
FIG. 2 is a perspective view illustrating a power transmitting coil in a wireless power supply system, a travel lane, and electromagnetic shielding walls in the wireless power transmission system according to a preferred embodiment of the present invention together with a moving body.
Figure 3:
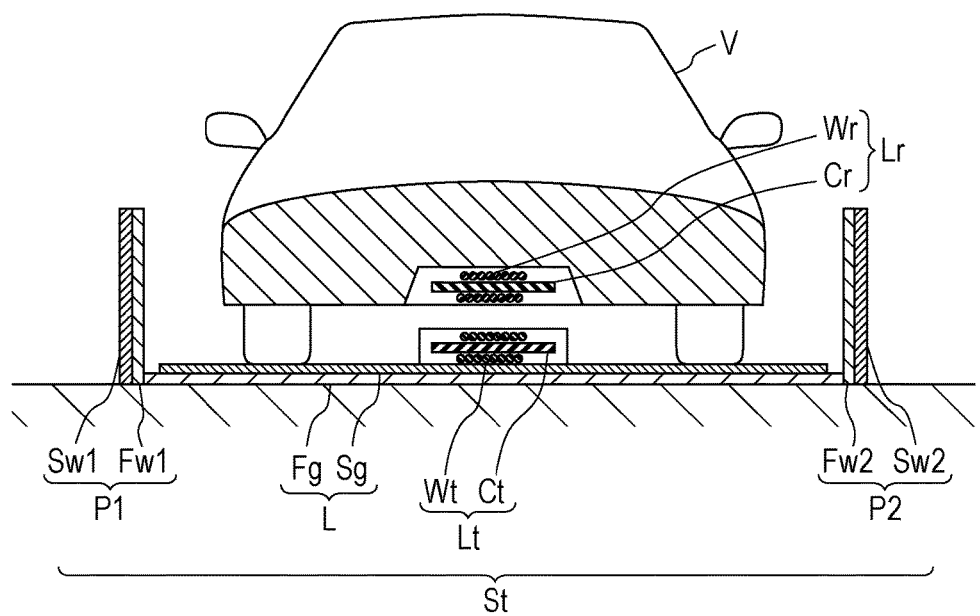
FIG. 3 is a schematic cross-sectional view taken along line I-I of FIG. 2.

First, an overall configuration of a wireless power transmission system S1 according to a preferred embodiment of the present invention will be described with reference to FIG. 1 to FIG. 3. FIG. 1 is a schematic system configuration diagram illustrating an electrical configuration of the wireless power transmission system according to a preferred embodiment of the present invention and a load. FIG. 2 is a perspective view illustrating a power transmitting coil in a wireless power supply system, a travel lane, and electromagnetic shielding walls in the wireless power transmission system according to a preferred embodiment of the present invention together with a moving body. FIG. 3 is a schematic cross-sectional view taken along line I-I of FIG. 2.

The wireless power transmission system S1 includes a wireless power supply system St and a wireless power receiving system Sr. The wireless power supply system St includes a power source PW, an inverter INV, a power transmitting coil Lt, a travel lane L, electromagnetic shielding walls P1 and P2, a magnetic coupling member Fg, and a conductive sheet Sg. The wireless power receiving system Sr includes a power receiving coil Lr and a rectifier DB. Note that the wireless power transmission system S1 according to this embodiment is applied to a wireless power transmission system for moving bodies. Therefore, the wireless power supply system St is applied to power supply equipment on the ground side, and the wireless power receiving system Sr is mounted on a moving body V. Note that, in FIG. 1 to FIG. 3, a vehicle is illustrated as the moving body V; however, the wireless power supply system and the wireless power transmission system according to the present invention are not limited to this and are applicable to trains, monorail cars, or industrial machines that move around in factories to transport products, for example.

The power source PW supplies direct-current power to the inverter INV described below, as illustrated in FIG. 1. The power source PW is not specifically limited as long as the power source PW is a power source that outputs direct-current power, and examples thereof include a direct-current power source that rectifies and smooths commercial alternating-current power, a secondary battery, a direct-current power source performing solar photovoltaic power generation, or a switching power source apparatus, such as a switching converter.

The inverter INV has a function of converting the input direct-current power supplied from the power source PW into alternating-current power. The inverter INV converts the input direct-current power supplied from the power source PW into alternating-current power and supplies the alternating-current power to the power transmitting coil Lt described below. The inverter INV is formed of a switching circuit that is constituted by a plurality of ridge-connected switching elements. Examples of the switching elements that constitute the switching circuit include MOS-FETs (Metal Oxide Semiconductor-Field Effect Transistors), IBGTs (Insulated Gate Bipolar Transistors), and other elements. Note that, in FIG. 2 and FIG. 3, the power source PW and the inverter INV are not illustrated. The positions at which the power source PW and the inverter INV are installed are not specifically limited. The power source PW and the inverter INV may be installed beside the travel lane L described below and the electromagnetic shielding walls P1 and P2 or may be installed in the ground under the travel lane L described below.

The power transmitting coil Lt has a function of transmitting the alternating-current power supplied from the inverter INV to the power receiving coil Lr described below. The power transmitting coil Lt is a solenoid coil formed by spirally winding a winding Wt formed of a litz wire made of copper, aluminum or the like around a sheet-like or rod-like magnetic core Ct, as illustrated in FIG. 3. The number of turns of the power transmitting coil Lt is set as appropriate on the basis of the separation distance from the power receiving coil Lr described below, desired power transmission efficiency, and so on. The power transmitting coil Lt is installed on the travel lane L described below or in the travel lane L described below. In this embodiment, the power transmitting coil Lt is disposed on the travel lane L.

The power transmitting coil Lt is disposed such that the axial direction of the power transmitting coil Lt is substantially parallel to the width direction of the travel lane L described below. That is, the axial direction of the power transmitting coil Lt is a direction that is substantially parallel to the surface of the travel lane L described below and is substantially orthogonal to the direction of travel of the moving body V described below. As a result, the power transmitting coil Lt generates a magnetic field oriented substantially parallel to the surface of the travel lane L described below and substantially orthogonal to the direction of travel of the moving body V described below. However, "substantially parallel to the surface of the travel lane L" mentioned here is not meant to exclude even an unintended slope of the surface of the travel lane L, an installation error of the power transmitting coil Lt, and so on. Further, "substantially orthogonal to the direction of travel of the moving body V" mentioned here is not meant to exclude even a slight slope caused by an installation error of the power transmitting coil Lt or the like. Moreover, a certain amount of difference, such as the difference between the direction of travel of the moving body V assumed in the design and the actual direction of travel of the moving body V, should be allowed.

The travel lane L is an area or a road for performing wireless power transmission along which the moving body V described below passes. Note that, in this embodiment, the travel lane L includes only one lane; however, the travel lane L may include a plurality of lanes. Further, to the travel lane L, a center line marking or a guide line marking may be provided to suggest the direction of travel to the driver of the moving body, or a guide rail or the like may be installed to control the direction of travel. In this embodiment, however, the electromagnetic shielding walls P1 and P2 described below are disposed on the respective sides of the travel lane L in the direction of travel, and therefore, the direction in which the moving body V travels along the travel lane L is mostly fixed to one direction. Therefore, it is possible to omit a measure for enabling determination of the section corresponding to the travel lane L from the external appearance.

In this embodiment, the travel lane L is installed on the ground, as illustrated in FIG. 3. In this case, the surface of the travel lane L is a plane that is in contact with the tires of the moving body V and, specifically, is a side of the conductive sheet Sg described below that faces the moving body V. Note that the travel lane L may be installed in the ground. In this case, the surface of the travel lane L corresponds to the ground surface where the travel lane L is disposed. The width direction of the travel lane L in the present invention means a direction that is substantially parallel to the surface of the travel lane L and is substantially orthogonal to the direction of travel of the moving body V regardless of the shape of the travel lane L.

The electromagnetic shielding walls P1 and P2 are disposed on the respective sides of the travel lane L in the extension direction of the travel lane L. Specifically, as illustrated in FIG. 3, the electromagnetic shielding wall P1 is disposed on one side (on the left of the figure) in the extension direction of the travel lane L, and the electromagnetic shielding wall P2 is disposed on the other side (on the right of the figure) in the extension direction of the travel lane L. The electromagnetic shielding wall P1 includes a magnetic wall Fw1 and a conductive wall Sw1, and the electromagnetic shielding wall P2 includes a magnetic wall Fw2 and a conductive wall Sw2. Note that, in the case where the travel lane L includes a plurality of lanes, the electromagnetic shielding walls P1 and P2 may be provided on the respective sides of each lane in accordance with a desired effect of reducing a leakage magnetic field, or the electromagnetic shielding walls P1 and P2 may be provided only on the respective sides of the travel lane L. Here, the extension direction of the travel lane L means a direction in which the moving body V mostly travels along the travel lane L regardless of the shape of the travel lane L.

The magnetic wall Fw1 is disposed on a side of the electromagnetic shielding wall P1 close to the travel lane L, and the magnetic wall Fw2 is disposed on a side of the electromagnetic shielding wall P2 close to the travel lane L. It is desirable to form the magnetic walls Fw1 and Fw2 so that a magnetic path through which leakage magnetic flux passes can be easily formed. Preferably, the magnetic walls Fw1 and Fw2 are formed of a magnetic material, such as ferrite, having a high relative permeability and a low magnetoresistivity.

The conductive wall Sw1 is disposed on a side of the electromagnetic shielding wall P1 opposite the travel lane L, and the conductive wall Sw2 is disposed on a side of the electromagnetic shielding wall P2 opposite the travel lane L. Specifically, the conductive wall Sw1 is disposed on the external side of the magnetic wall FW1 relative to the travel lane L, and the conductive wall Sw2 is disposed on the external side of the magnetic wall FW2 relative to the travel lane L. That is, when seen from the travel lane L, the magnetic wall Fw1 and the conductive wall Sw1 are disposed in this order. Similarly, when seen from the travel lane L, the magnetic wall Fw2 and the conductive wall Sw2 are disposed in this order. The conductive walls Sw1 and Sw2 function as electromagnetic shielding members for cancelling a magnetic field with an induced current, an eddy current, or the like to suppress passing of magnetic flux. The conductive walls Sw1 and Sw2 are not specifically limited as long as the conductive walls Sw1 and Sw2 are nonmagnetic conductors having a surface that functions as an electromagnetic shielding member, and examples thereof include a sheet made of aluminum or copper or a galvanized steel sheet.

The magnetic coupling member Fg has a function of magnetically coupling the magnetic wall Fw1 of the electromagnetic shielding wall P1 with the magnetic wall Fw2 of the electromagnetic shielding wall P2. That is, the magnetic walls Fw1 and Fw2 that are disposed on the respective sides of the travel lane L are magnetically coupled with each other. In this case, within magnetic flux generated by the power transmitting coil Lt, magnetic flux that makes a large circuit extending to a location away from the power transmitting coil Lt can easily form a magnetic path that passes through the magnetic wall Fw1, the magnetic coupling member Fg, and the magnetic wall Pw2. As a result, magnetic flux that leaks outside the electromagnetic shielding walls P1 and P2 is further reduced, and the leakage magnetic field can be reduced more effectively. Note that "magnetically coupling" mentioned here means disposing the magnetic coupling member Fg so that the magnetic resistance of a magnetic path that passes through the magnetic walls Fw1 and Fw2 and the magnetic coupling member Fg decreases. Therefore, it is desirable to form the magnetic coupling member Fg by using a magnetic material, such as ferrite, having a high relative permeability and a low magnetoresistivity. In this embodiment, the magnetic coupling member Fg is formed of a sheet-like ferrite member and has one end coupled to the magnetic wall Fw1 of the electromagnetic shielding wall P1 and the other end coupled to the magnetic wall Fw2 of the electromagnetic shielding wall P2. Note that the magnetic wall Fw1 and the magnetic wall Fw2 need to be magnetically coupled with each other by the magnetic coupling member Fg, and the magnetic coupling member Fg need not be in physical contact with the magnetic walls Fw1 and Fw2. Therefore, a certain amount of space may be present between the magnetic coupling member Fg and the magnetic wall Fw1 and between the magnetic coupling member Fg and the magnetic wall Fw2.

The conductive sheet Sg is disposed along the magnetic coupling member Fg on a side of the magnetic coupling member Fg that faces the moving body V and on a side of the power transmitting coil Lt opposite a side thereof that faces the moving body V. That is, the conductive sheet Sg is disposed between the power transmitting coil Lt and the magnetic coupling member Fg. The conductive sheet Sg functions as an electromagnetic shielding member for cancelling a magnetic field with an induced current, an eddy current, or the like to suppress magnetic coupling of the power transmitting coil Lt with the magnetic coupling member Fg. As a result, it is possible to prevent a decrease in power transmission efficiency caused by reduction of magnetic flux that is linked with the power receiving coil Lr described below. The conductive version Sg is not specifically limited as long as the conductive version Sg is a nonmagnetic conductor having a surface that functions as an electromagnetic shielding member, and examples thereof include a sheet made of aluminum or copper or a galvanized steel sheet. When the power transmitting coil Lt and the conductive sheet Sg are seen from the facing direction of the power receiving coil Lr described below and the power transmitting coil Lt, the conductive sheet Sg may be formed so as to have an outline larger than the outline of the power transmitting coil Lt.

The power receiving coil Lr has a function of receiving the alternating-current power transmitted from the power transmitting coil Lt. In this embodiment, the power receiving coil Lr includes a magnetic core Cr and a winding Wr, as illustrated in FIG. 3. The power receiving coil Lr is a spirally wound solenoid coil formed by winding the winding Wr formed of a litz wire made of copper, aluminum or the like around the magnetic core Cr, which is a sheet-like or rod-like core. The axial direction of the power receiving coil Lr is parallel to the axial direction of the power transmitting coil Lt. The number of turns of the power receiving coil Lr is set as appropriate on the basis of the separation distance from the power transmitting coil Lt, desired power transmission efficiency, and so on. The power receiving coil Lr thus formed is disposed on a side of the moving body V close to the travel lane L. In this embodiment, the height at which the power receiving col Lr disposed in the moving body V is positioned is lower than the height of the electromagnetic shielding walls P1 and P2. In other words, the height of the electromagnetic shielding walls P1 and P2 is higher than the height at which the power receiving coil Lr disposed in the moving body V is positioned. In this case, magnetic flux that leaks outside the electromagnetic shielding walls P1 and P2 is further reduced, and the leakage magnetic field can be reduced with more certainty.

The rectifier circuit DB is disposed in the moving body V and has a function of rectifying the alternating-current power received by the power receiving coil Lr to direct-current power. Examples of the rectifier circuit DB include a converter circuit having a full-wave rectification function using a diode bridge and a power smoothing function using capacitors and a three-terminal regulator. The direct-current power rectified by the rectifier circuit DB is output to a load R. Here, examples of the load R include a secondary battery mounted on the moving body V.

Figure 4:
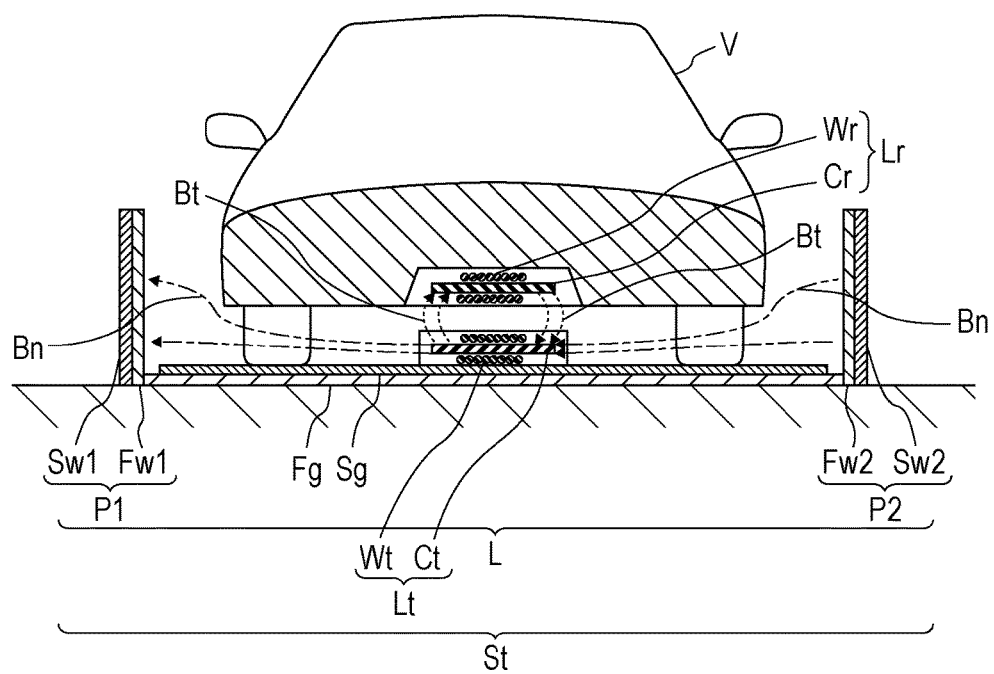
FIG. 4 is a diagram schematically illustrating magnetic flux generated by the power transmitting coil.

Next, magnetic flux generated by the power transmitting coil Lt in this embodiment and an effect of reducing an unwanted leakage magnetic field will be described with reference to FIG. 4. FIG. 4 is a diagram schematically illustrating magnetic flux generated by the power transmitting coil in FIG. 3. Note that magnetic flux within the magnetic core Ct of the power transmitting coil Lt, the magnetic core Cr of the power receiving coil Lr, the magnetic walls Fw1 and Fw2, and the magnetic coupling member Fg is not illustrated.

In FIG. 4, within magnetic flux that is linked with the power transmitting coil Lt, magnetic flux Bt that is also linked with the power receiving coil Lr and magnetic flux Bn that is not linked with the power receiving coil Lr are illustrated. Here, the power transmitting coil Lt generates a magnetic field oriented substantially parallel to the surface of the travel lane L and substantially orthogonal to the direction of travel of the moving body V. Therefore, the magnetic flux Bt and Bn are oriented substantially orthogonal to the direction of travel of the moving body V along the surface of the travel lane L and linked with the power transmitting coil Lt.

As illustrated in FIG. 4, the power transmitting coil Lt generates the magnetic flux Bt that is linked with the power receiving coil Lr. When the magnetic flux Bt is linked with the power receiving coil Lr, electromotive force is generated at the winding Wr of the power receiving coil Lr. Then, the power generated at the power receiving coil Lr is rectified by the rectifier circuit DB and output to the load R.

Here, the conductive sheet Sg is installed between the power transmitting coil Lt and the magnetic coupling member Fg, and therefore, reduction of magnetic flux that is linked with the power receiving coil Lr is suppressed, the reduction being caused by the magnetic flux Bt forming a magnetic path that passes through the magnetic coupling member Fg. That is, the conductive sheet Sg suppresses excessively high magnetic coupling between the power transmitting coil Lt and the magnetic coupling member Fg, and it is possible to prevent a noticeable decrease in magnetic coupling between the power transmitting coil Lt and the power receiving coil Lr. As a result, a decrease in power transmission efficiency is suppressed.

On the other hand, the power transmitting coil Lt generates the magnetic flux Bn that is not linked with the power receiving coil Lr, as illustrated in FIG. 4, and the magnetic flux Bn forms a magnetic path that leaks from the power transmitting coil Lt in the direction substantially orthogonal to the direction of travel of the moving body V. That is, the direction in which the magnetic flux Bn leaks from the power transmitting coil Lt is the direction substantially orthogonal to the direction of travel of the moving body V. Here, the electromagnetic shielding walls P1 and P2 are disposed on the respective sides of the travel lane L in the extension direction of the travel lane L, and therefore, leakage of the magnetic flux Bn to outside of the electromagnetic shielding walls P1 and P2 is suppressed. As a result, the intensity of the leakage magnetic field represented by the magnetic flux density outside the electromagnetic shielding walls P1 and P2 becomes small.

As described above, the power transmitting coil Lt that is included in the wireless power supply system St according to this embodiment and that is disposed such that the axial direction is substantially parallel to the width direction of the travel lane L generates a magnetic field oriented substantially parallel to the surface of the travel lane L and substantially orthogonal to the direction of travel of the moving body V. That is, the direction in which the magnetic flux Bn leaks from the power transmitting coil Lt is the direction substantially orthogonal to the direction of travel of the moving body V. In this case, even if the relative position relationship of the moving body V that moves on the travel lane L to the power transmitting coil Lt changes, the direction in which the magnetic flux Bn leaks from the power transmitting coil Lt is always the direction substantially orthogonal to the direction of travel of the moving body V. Further, in this embodiment, the electromagnetic shielding walls P1 and P2 are disposed on the respective sides of the travel lane L in the extension direction of the travel lane L, and therefore, the electromagnetic shielding walls P1 and P2 are positioned in the direction in which the magnetic flux Bn leaks from the power transmitting coil Lt. As a result, it is possible to reduce the leakage magnetic field effectively even if the relative position relationship of the moving body V to the power transmitting coil Lt changes.

Further, in this embodiment, the electromagnetic shielding wall P1 includes the magnetic wall Fw1 and the conductive wall Sw1 disposed on the external side of the magnetic wall Fw1, and the electromagnetic shielding wall P2 includes the magnetic wall Fw2 and the conductive wall Sw2 disposed on the external side of the magnetic wall Fw2. Therefore, the magnetic flux Bn that leaks in the direction substantially orthogonal to the direction of travel of the moving body V can easily form a magnetic path that passes through the magnetic walls Fw1 and Fw2 having a low magnetoresistivity. Further, the conductive walls Sw1 and Sw2 that are respectively disposed on the external sides of the magnetic walls Fw1 and Fw2 suppress passing of the magnetic flux Bn from the magnetic walls Fw1 and Fw2 to outside of the travel lane L. As a result, magnetic flux that leaks outside the electromagnetic shielding walls P1 and P2 is reduced, and the leakage magnetic field can be reduced more effectively.

Further, in this embodiment, the magnetic coupling member Fg that magnetically couples the magnetic walls Fw1 and Fw2 disposed on the respective sides of the travel lane L with each other is provided. That is, the magnetic wall Fw1 and the magnetic wall Fw2 are magnetically coupled with each other by the magnetic coupling member Fg. Therefore, the magnetic flux Bn can easily form a magnetic path that passes through the magnetic wall Fw1, the magnetic coupling member Fg, and the magnetic wall Fw2. As a result, magnetic flux that leaks outside the electromagnetic shielding walls P1 and P2 is further reduced, and the leakage magnetic field can be reduced more effectively.

Furthermore, in this embodiment, the conductive sheet Sg that is disposed between the power transmitting coil Lt and the magnetic coupling member Fg is provided, and the conductive sheet Sg suppresses magnetic coupling between the power transmitting coil Lt and the magnetic coupling member Fg. Therefore, it is possible to prevent a decrease in power transmission efficiency caused by reduction of magnetic flux that is linked with the power receiving coil Lr provided in the moving body V.

Further, in this embodiment, the height of the electromagnetic shielding walls P1 and P2 is higher than the height at which the power receiving coil Lr is positioned. Therefore, within the leakage magnetic flux, leakage magnetic flux that passes through space between the electromagnetic shielding wall P1 or P2 and the moving body V can also easily form a magnetic path that passes through the magnetic walls Fw1 and Fw2 having a lower magnetoresistivity. As a result, magnetic flux that leaks outside the electromagnetic shielding walls P1 and P2 can be further reduced, and therefore, the leakage magnetic field can be reduced with more certainty.

The present invention has been described above with reference to the embodiment. The embodiment is an example, and it is understood by a person skilled in the art that various modifications and changes can be made within the scope of claims of the present invention and that such modifications and changes also fall within the scope of claims of the present invention. Therefore, the description and drawings herein should be considered as illustrative and not restrictive.

Here, in order to sufficiently attain the effects of the present invention, a certain amount of deviation is allowed for the "width direction of the travel lane L". Specifically, it should be considered that the effects of the present invention can be attained as long as the power transmitting coil Lt is disposed such that an extension line in the axial direction of the power transmitting coil Lt crosses the electromagnetic shielding wall P1 and the electromagnetic shielding wall P2.

REFERENCE SIGNS LIST

S1 . . . wireless power transmission apparatus, St . . . wireless power supply system, PW . . . power source, INV . . . inverter, Lt . . . power transmitting coil, Wt . . . winding of power transmitting coil, Ct . . . winding of power transmitting coil, L . . . travel lane, Fg . . . magnetic coupling member, Sg . . . conductive sheet, P1, P2 . . . electromagnetic shielding wall, FW1, Fw2 . . . magnetic wall, Sw1, Sw2 . . . conductive wall, Lr . . . power receiving coil, DB . . . rectifier circuit, R . . . load, V . . . moving body.

The invention claimed is:
1. A wireless power supply system provided with a travel lane for wirelessly transmitting power to a moving body, the wireless power supply system comprising:
   a power transmitting coil that is wound around an axis extending in an axial direction, the axial direction being substantially parallel to a width direction of the travel lane; and a pair of electromagnetic shielding walls that are respectively disposed along two corresponding sides of the travel lane so as to reduce leakage of magnetic flux generated by the power transmitting coil.

2. The wireless power supply system according to claim 1, wherein the electromagnetic shielding walls each include a magnetic wall and a conductive wall that is disposed on an external side of the magnetic wall.

3. The wireless power supply system according to claim 2, further comprising a magnetic coupling member that magnetically couples the magnetic walls disposed on the respective sides of the travel lane with each other.

4. The wireless power supply system according to claim 3, further comprising a conductive sheet that is disposed between the power transmitting coil and the magnetic coupling member.

5. A wireless power transmission system comprising:
the wireless power supply system according to claim 1; and
a moving body on which a power receiving coil is mounted, wherein
the electromagnetic shielding walls have a height that is higher than a height at which the power receiving coil is positioned.

6. A wireless power transmission system comprising:
the wireless power supply system according to claim 2; and
a moving body on which a power receiving coil is mounted, wherein
the electromagnetic shielding walls have a height that is higher than a height at which the power receiving coil is positioned.

7. A wireless power transmission system comprising:
the wireless power supply system according to claim 3; and
a moving body on which a power receiving coil is mounted, wherein
the electromagnetic shielding walls have a height that is higher than a height at which the power receiving coil is positioned.

8. A wireless power transmission system comprising:
the wireless power supply system according to claim 4; and
a moving body on which a power receiving coil is mounted, wherein
the electromagnetic shielding walls have a height that is higher than a height at which the power receiving coil is positioned.

* * * * *